US 6,735,176 B1

(12) United States Patent
So (10) Patent No.: US 6,735,176 B1
(45) Date of Patent: May 11, 2004

(54) DYNAMIC BANDWIDTH MANAGEMENT AND REROUTING

(75) Inventor: Tricci So, Kanata (CA)

(73) Assignee: Nortel Networks Limited, St. Laurent ( * ) Notice: Subject to any disclaimer, the term of this patent is extended or adjusted under 35 U.S.C. 154(b) by 0 days.

(21) Appl. No.: 09/177,602

(22) Filed: Oct. 23, 1998

Related U.S. Application Data

(60) Provisional application No. 60/079,629, filed on Mar. 27, 1998.

(30) Foreign Application Priority Data

Mar. 26, 1998 (CA) ............................................. 2233395

(51) Int. Cl.[7] ............................................. G01R 31/08
(52) U.S. Cl. ...................... 370/237; 370/231; 370/395.1
(58) Field of Search ................................ 370/216, 217, 370/218, 221, 222, 223, 225, 228, 235, 237, 395.1, 400, 401, 410

(56) References Cited

U.S. PATENT DOCUMENTS

| | | | | |
|---|---|---|---|---|
| 5,241,534 A | * | 8/1993 | Omuro et al. | 370/218 |
| 5,280,470 A | * | 1/1994 | Buhrke et al. | 370/232 |
| 5,315,586 A | * | 5/1994 | Charvillat | 370/232 |
| 5,317,562 A | * | 5/1994 | Nardin et al. | 370/428 |
| 5,497,368 A | * | 3/1996 | Reijnierse et al. | 370/351 |
| 5,898,673 A | * | 4/1999 | Riggan et al. | 370/237 |
| 5,920,705 A | * | 7/1999 | Lyon et al. | 370/409 |
| 5,953,338 A | * | 9/1999 | Ma et al. | 370/377 |
| 6,094,431 A | * | 7/2000 | Yamato et al. | 370/395.21 |
| 6,097,722 A | * | 8/2000 | Graham et al. | 370/395.21 |
| 6,111,881 A | * | 8/2000 | Soncodi | 370/395 |
| 6,115,753 A | * | 9/2000 | Joens | 370/256 |
| 6,154,444 A | * | 11/2000 | Masuo et al. | 370/225 |
| 6,222,823 B1 | * | 4/2001 | Smith et al. | 370/230 |

FOREIGN PATENT DOCUMENTS

WO   WO 95/28047   10/1995   ........... H04L/12/26

OTHER PUBLICATIONS

Jones, C.K. et al., "A Fast ATM Rerouting Algorithm for Networks with Unreliable Links", Serving Humanity Through Communications, Supercomm/ICC, New Orleans, May 1–5, 1994, vol. 1, May 1, 1994, pp. 91–95.

Yuan, R. et al., "A Signaling and Control Architecture for Mobility Support in Wireless ATM Networks", 1996 IEEE International Conference on Communications (ICC), Converging Technologies for Tomorrow's Applications, Jun. 23–27, 1996, pp. 478–484.

Hadama, H. et al., "Virtual Path Restoration Techniques Based on Centralized Control Functions", Electronics & Communications in Japan, Part I—Communications, vol. 78, No. 3, Mar. 1, 1995, pp. 13–26.

Marco De, M. et al., "Bandwidth Re–Negotiation in ATM Networks for High–Speed Computer Communications", Globecom '95, IEEE Global Telecommunications Conference, Singapore, Nov. 14–16, 1995, vol. 1, Nov. 14, 1995, pp. 393–398.

* cited by examiner

*Primary Examiner*—Kenneth Vanderpuye
*Assistant Examiner*—Bob A. Phunkulh (57) ABSTRACT

A communications network performs a variety of maintenance actions. One of those actions is rerouting of a connection path. A feature called "dynamic resource management option" allows the network or the called party of an active connection to initiate a resource change procedure when needs arises. The resource change can also be achieved by rerouting the existing path of the active connection. However a maintenance action taken in one network domain is only effected within the same domain, because a different domain may have different maintenance procedures. Telecommunication connections often span more than one domain and a request for resource adjustment must be considered differently for a proper maintenance action. A resource change indication message includes a flag to indicate the message originated within or outside the domain. By observing the flag, it is possible to decide on a proper maintenance procedure.

25 Claims, 4 Drawing Sheets

DYNAMIC BANDWIDTH MANAGEMENT AND REROUTING

CROSS REFERENCES

This invention relates to an applicant's pending U.S. application Ser. No. 09/048,844 filed on Mar. 27, 1998 which is based upon U.S. Provisional applications Serial No. 60/079,629 filed Mar. 27, 1998 and Ser. No. 60/051767 filed Jul. 7, 1997.

FIELD OF INVENTION

The invention generally relates to a network resource management of ATM networks. In particular, it is directed to a technique of performing reroute procedures in the event of a bandwidth change request.

BACKGROUND OF INVENTION

The current ITU-T Q.2963.2 Recommendation (B-ISDN DSS2 Connection Modification—ATM Traffic Descriptor Modification by connection owner) provides the capability for the connection owner to initiate the MODIFY message to adjust the PCR (peak cell rate), SCR (sustainable cell rate) and MBS (?) a, dynamically on an active connection. However, in an ATM network environment which integrates with a variety of technologies, such as IMA (inverse multiplexing on ATM), WATM (wireless ATM), ADSL (asymmetric digital subscriber loop) and MPOA etc., there is a need for the network as well as the called party to have the capability to request the connection's bandwidth to be changed dynamically.

Rather than introducing unnecessary complex changes to the existing ITU-T Q.2963.2 procedures to handle the collisions of multiple "modify" requests, which are originated at the different points of a connection, the above referenced patent application introduces a new signalling capability to complement the ITU-T Q.2963.2 feature to manage connection bandwidth dynamically. The new capability defines a new information element called "dynamic bandwidth management option" in the existing "setup" message and allows the connection owner (i.e. the originator of the connection who initiates the "setup" message) to specify the dynamic bandwidth management option for point-to-point connections, and for the first party of the point-to-multipoint connections, during the connection establishment phase. When the network or the called party have the need to adjust the bandwidth on an active connection, it can follow the specified bandwidth management option, if given, to initiate the proper action to deal with the changes.

In order to accommodate the requested bandwidth changes, the network or the connection owner may perform certain maintenance procedures. For example, the connection owner may send a "modify" message on the connection to increase or reduce the bandwidth or such other characteristics of the connection. It is also possible that the connection may have to be rerouted to a new connection path with an adjusted bandwidth. However such maintenance actions taken in one domain are only effected within the same domain, because a different domain may have different maintenance procedures. Telecommunication connections often span more than one domain and a request for bandwidth adjustment must be considered differently for a proper maintenance action, whether or not the request originated within or outside the domain.

One of many maintenance actions is rerouting a connection path, which is normally performed by the network. A connection path between a source node and a destination node span across one or more network domains and is made up of one or more connection segments involving one or more intermediate nodes.

Figure 1:
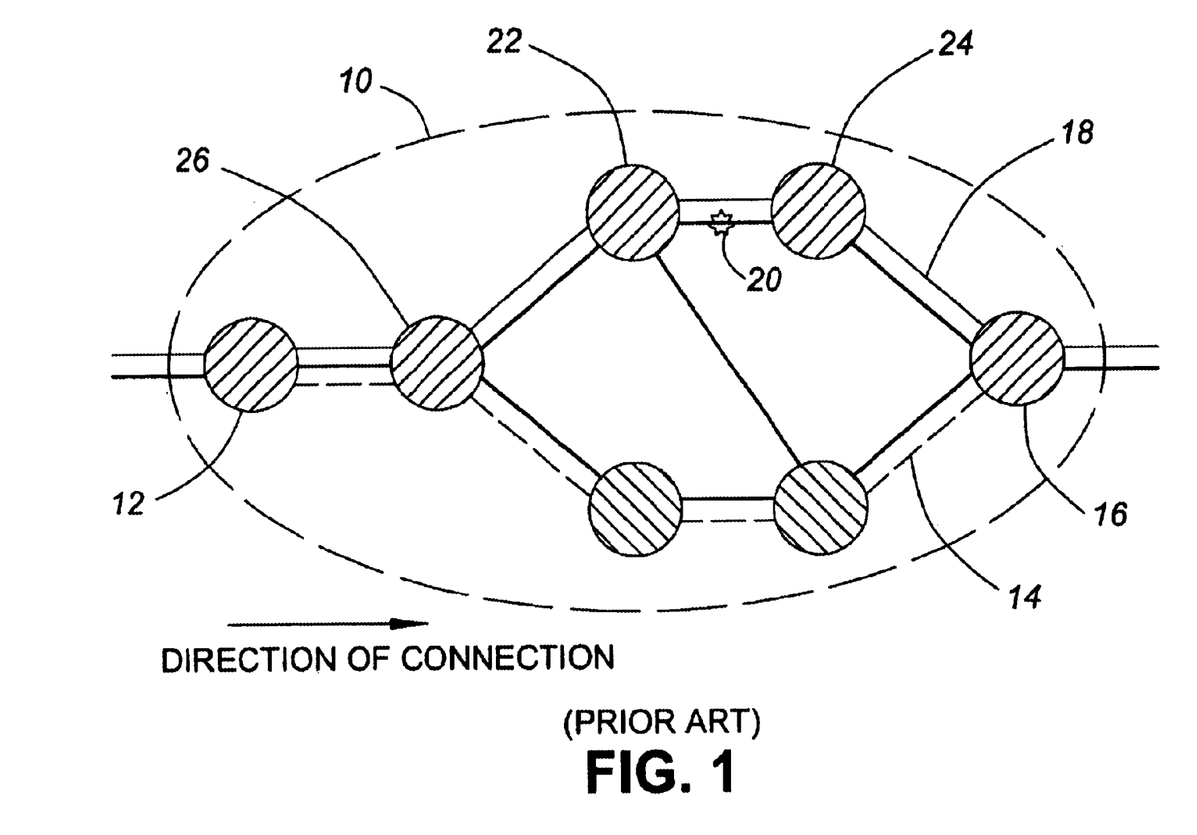
FIG. 1 shows a known rerouting operation within a domain.

An edge-based rerouting is a rerouting mechanism which replaces a connection segment within a network domain starting from a source node of the domain and ending at a destination node of the domain. In the context of rerouting, the network domain is a collection of nodes which participate in rerouting decisions and actions. FIG. 1 shows a rerouting operation within the domain 10. A rerouting node 12 is a node which is responsible for establishing an alternative connection path 14 to a predetermined terminating node 16 which is called a rendezvous node. In this example, the rerouting node is the source node of the domain and the rendezvous node is the destination node of the domain. FIG. 1 also show variety of intermediate nodes. An original path 18 must be rerouted because of a failed link 20 between two nodes, which will be called a rebounce node 22 and a blocking node 24, depending upon the direction of connection. A potential cross-over node 26 is also shown.

There are two types of edge-based rerouting, e.g., "break-before-make" and "make-before-break". They are also referred as "hard reroute" and "soft reroute" respectively. "Hard reroute" can be used for connection recovery or priority control features. For other rerouting features such as path optimization and administrative rerouting etc., "soft reroute" is required.

For the edge-based rerouting, the rerouting node and rendezvous node participate in the connection control of a rerouting operation. To have a simple solution to handle the possible collision between the "hard reroute" and "soft reroute", a rerouting state machine is designed to run at each end of a connection segment to coordinate the protocol handshake. In order to simplify the rerouting procedures, an agreement was made to allow one and only one rerouting operation to be executed in a switch for a connection at one time. However, due to the different nature of triggering the soft reroute versus the hard reroute, it is possible that the soft reroute operation may be interrupted by the hard reroute. In this case, the hard reroute will preempt the soft reroute and proceed with the hard rerouting operation. Consequently, the design of the rerouting state machine is based on this assumption.

Figure 2:
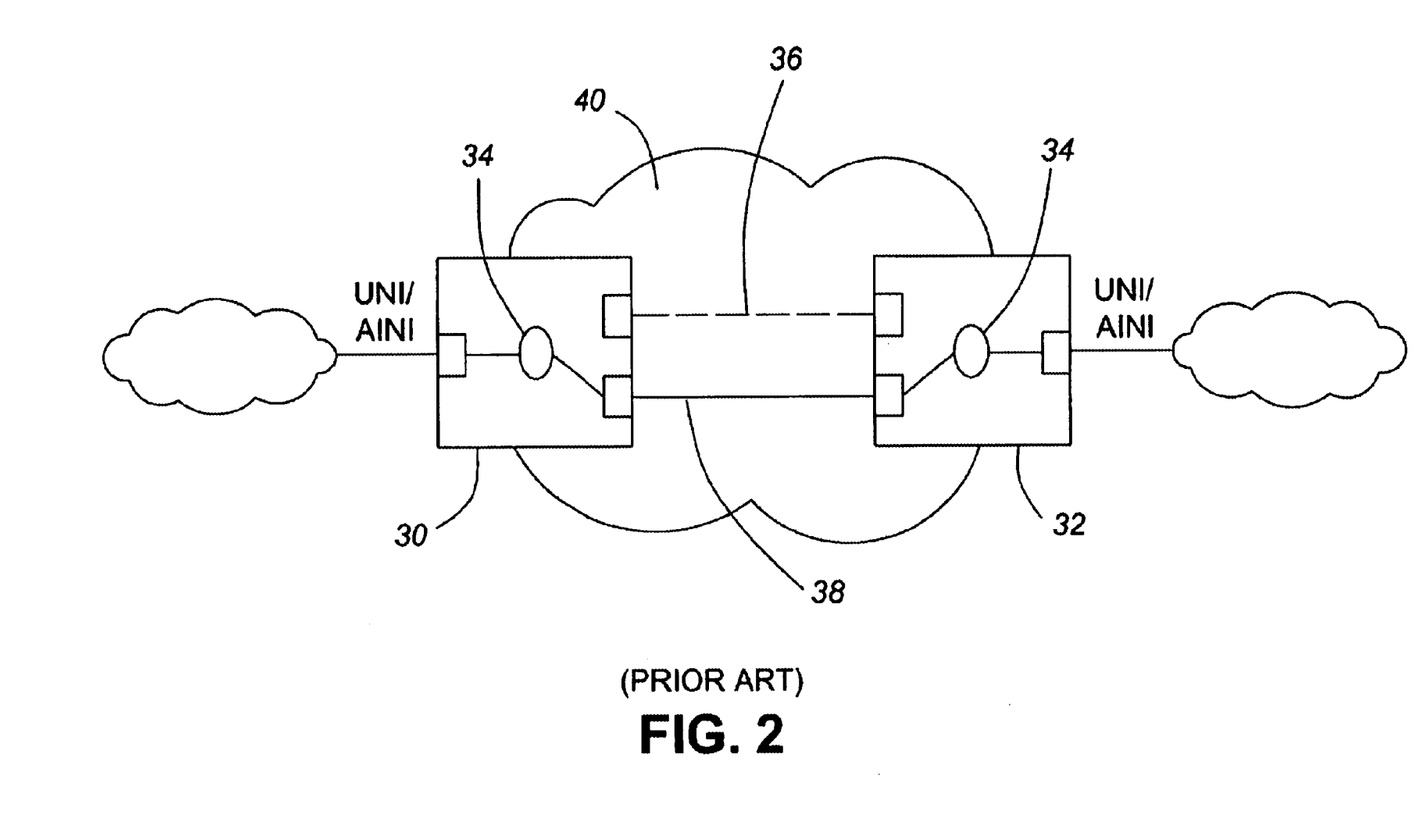
FIG. 2 shows an operation model of a known edge-based rerouting.

FIG. 2 shows an operation model of an edge-based rerouting between a rerouting node 30 and a rendezvous node 32. For each connection, the rerouting state machine 34 is operating in parallel with the connection state machine at the edges of a PNNI network (domain) 36. Therefore, in some cases when a switch is performing a "soft reroute", up to three state machines may be running simultaneous to reroute a connection, e.g. two connection state machines (one for the incumbent connection 38 and one for the rerouting connection 40), and one rerouting machine. It should be noted that the rerouting connection in FIG. 2 is going through a different interface than the incumbent one. However, it is possible that the rerouting connection resides at the same interface as the incumbent connection.

It should be noted that the feature described herein is not designed solely for supporting the ITU-T Q.2963.2 feature. It is an useful capability to inform the connection owner as well as the network operator regarding a significant resource change demand in a network and whether or not the demand originated within the domain. As a result, a decision can be made to initiate a proper maintenance action or to continue/abort performing the action started so that the changes requested can be effectively dealt with.

OBJECTS OF INVENTION

It is therefore an object of the invention to provide a mechanism that allows determination of a proper maintenance procedure to be performed in response to a resource change request of an active connection.

It is another object of the invention to provide a mechanism to inform the connection owner or the network operator whether or not a resource change request originated within the domain.

It is yet a further object of the invention to provide a mechanism that allows determination as to whether or not to continue performing a maintenance procedure.

SUMMARY OF INTENTION

Briefly stated, the invention resides in an ATM network which is composed of a plurality of domains. According to one aspect, the invention is directed to a method of managing the resource demand of an active connection which spans one or more domains. The method comprises steps of performing a maintenance action at a maintenance node in one domain, receiving a resource change message at the maintenance node, the message indicating a resource change request; and deciding to continue performing the maintenance action in response to the resource change request based upon whether or not the resource change message originated outside the domain of the maintenance node.

DETAILED DESCRIPTION OF THE PREFERRED EMBODIMENTS OF INVENTION

Figure 3:
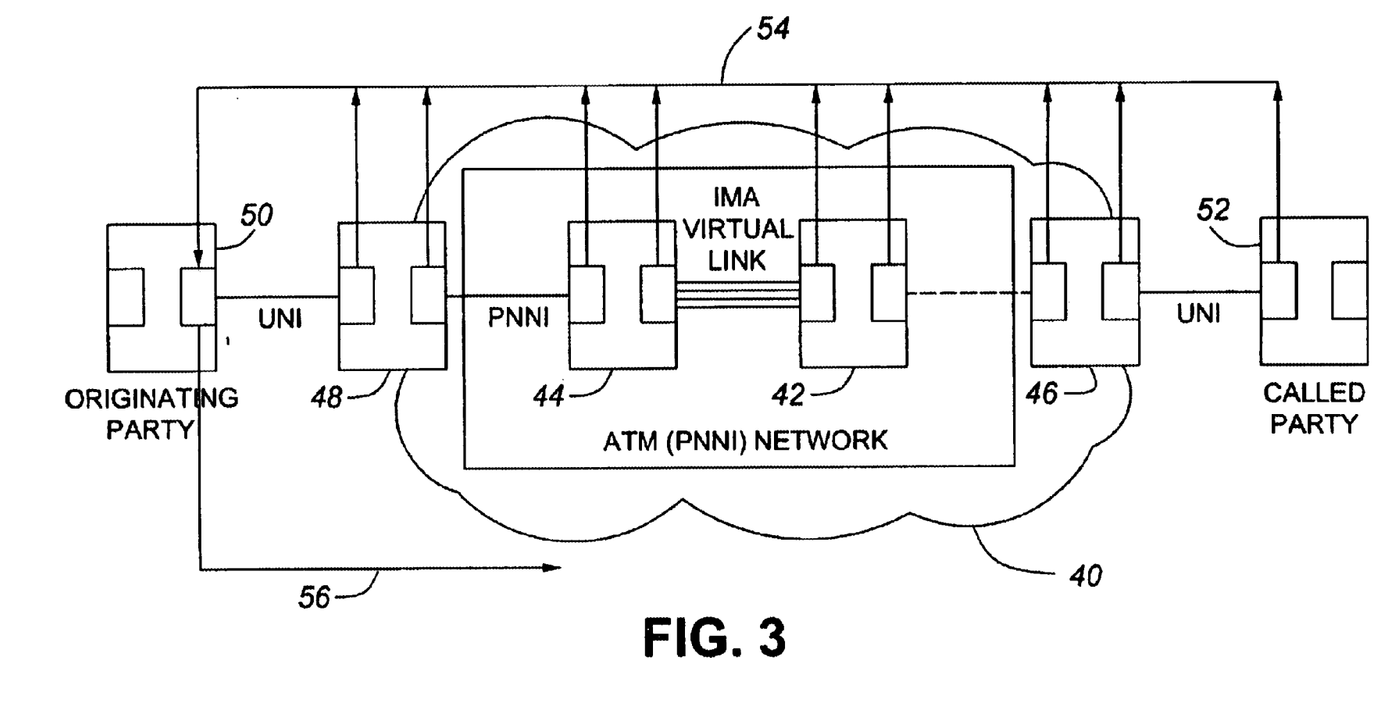
FIG. 3 is an overview of a bandwidth change indication message in an ATM environment.

FIG. 3 is an example of the bandwidth change indication operation in an ATM network. In the Figure, an ATM network 40 contains a variety of nodes 42, 44, 46 and 48, each having a variety of capabilities. As an example, nodes 42 and 44 are shown to be holding an IMA virtual link. Different interfaces link different pair of nodes, one being defined by ATM Forum under PNNI (Public Network Network Interface). Interfaces between a customer and an ATM node are defined in UNI (User Network Interface). Therefore a calling party 50 and a called party 52 are linked with respective nodes through UNI. For an illustration purpose, a path has been established between the calling party and the called party through nodes 48, 44, 42, and 46. The link between node 42 and 46 is shown as being of any kind. It should be emphasized that the links shown in the Figure are examples only. There are many different interfaces available in the field that can be used in this invention. Each node is able to initiate a "bandwidth change indication" message, when conditions warrant it.

In order to support this dynamic bandwidth change capability, the connection owner must include dynamic bandwidth management option information element in the "setup" request.

The existing "setup" message is modified to include the-new information element (IE for short) to specify dynamic bandwidth management options that the network and the called party are allowed to call for. This IE is specified by the connection owner and is sent to the network or the called party in the "setup" message during the initial connection establishment phase. The IE informs them of the connection owner's desired dynamic bandwidth management options for point-to-point connections and for the first user of point-to-multipoint connections. Many options are possible but some typical options would allow the network or the called party to:

(1) take no action;
(2) clear connection, if insufficient bandwidth resource to support the connection;
(3) inform the connection owner of the new bandwidth requirements which are specified in the "bandwidth change indication" message, set timer and wait for the maintenance action from the connection owner.

Based on the management option given by the connection owner, the network and the called party for that connection can determine the type of management action to perform when they encounter circumstances that require modification in resources on the connection. If the resources to be altered are the bandwidth requirement, it may be accomplished by the connection bandwidth modify procedures or rerouting. The "bandwidth change indication" message permits these procedures be initiated by not only the connection owner but the network and the called party. If dynamic bandwidth management option IE is absent in the "setup" message, it implies that no specific management option is expected by the connection owner from the network or the called party. However, it does not imply that the network cannot perform its own desired maintenance.

Any one or more of network elements located at any of the nodes shown in FIG. 3 can initiate bandwidth change indication procedure as shown by numeral 54. It is done by sending to the connection owner a "bandwidth change indication" message. The connection owner then initiates connection modify procedures as shown by numeral 56.

The "bandwidth change indication" message may contain one of the following IEs:

(1) the alternative ATM traffic descriptor IE to indicate the overall changes to the connection cell rate for a CBR or VBR connection.
(2) the minimum acceptable ATM traffic descriptor IE to indicate the changes for the peak cell rate parameter for a CBR, VBR, ABR or UBR connection.

According to an embodiment of the invention, in addition to above IEs, a "bandwidth change indication" message contains another E. This IE is an "external bandwidth change indicator". This IE allows the dynamic bandwidth adjustment feature to interact with the edge-based rerouting feature more effectively.

The "external bandwidth change indicator" IE is to indicate whether or not the "bandwidth change indication" message originated outside the network domain. It contains a single parameter called "external flag". Currently, only a single value is defined for the external flag, "outside scope of edge-based", which has the value "00000001". Of course other values for other circumstances are possible.

The flag is set by the first rendezvous node which intercepts the "bandwidth change indication" message and supports the edge-based rerouting. Depending upon options chosen, a bandwidth change indication message calls for reduction or increase of bandwidth for the connection. How this message is handled by variety of node along the connection path will be described below.

(a) If a network node is the rendezvous node which receives the "bandwidth change indication" message from the direction of the called party, when it is in the process of performing the "soft reroute" operation, one of the following actions takes place:
  1. The bandwidth change request is to reduce the bandwidth. In this case, the rendezvous node shall abort the "soft reroute" operation, and forward the "bandwidth change indication" message to upstream towards the calling party.
  2. The bandwidth change request is to increase the bandwidth. In this case, the rendezvous node shall not forward the "bandwidth change indication" message to upstream towards the calling party until the rerouting operation is completed. The decision of whether queuing or discarding the "bandwidth change indication" message is local implementation dependent, and is not within the scope of this description.
(b) If the network node is the rendezvous node which receives the "bandwidth change indication" message from the direction of the called party, when it is in the process of performing the "hard reroute" operation, it shall not forward the "bandwidth change indication" message to upstream towards the calling party until the connection is recovered. The decision of whether queuing or discarding the "bandwidth change indication" message is local implementation dependent, and is not within the scope of this description.
(c) If the network node is the rendezvous node which is not performing any rerouting operation, it shall insert the external bandwidth change indicator information element, if not present, with the external flag set to "outside scope of edge-based" in the "bandwidth change indication" message.
(d) If the network node is also a rerouting node and receives the "bandwidth change indication" message when it is in the progress of performing the "soft reroute" operation, one of the following action follows:
  1. If the bandwidth change request is to reduce the bandwidth. In this case, if the bandwidth change request is within the rerouting domain (i.e. the external bandwidth change indicator is not present ), the connection owner may ignore the bandwidth change request and carry on the rerouting operation. It is because that the rerouting may be able to get around the trouble area. Otherwise, if the bandwidth change request is not within the rerouting domain (i.e. the external bandwidth change indicator is present), the network node may abort the "soft reroute" operation and forward the "bandwidth change indication" message towards the calling party.
  2. If the bandwidth change request is to increase the bandwidth. In this case, the network node may ignore the bandwidth change request and carry on the rerouting operation. The decision of whether queuing or discarding the "bandwidth change indication" message is local implementation dependent, and is not within the scope of this description.

When the connection owner receives the "bandwidth change indication" message and the connection is in an active state, it may perform one of the following maintenance actions:
  1. release the connection if the new bandwidth requirement is not acceptable to the connection owner.
  2. initiate the "modify request" message (i.e. ITU-T Q.2963.2 procedures) with the cell rate specified in the "bandwidth change indication" message.
  3. initiate the edge-based "soft reroute" procedures if the connection owner is also a rerouting node, and if
     the connection owner realizes that the request is generated within its own rerouting domain (i.e. within a single private network), and
     a new path is found to maintain the new bandwidth requirement.

If the connection owner is also a rerouting node for the edge-based rerouting operation, it is possible that it is in the progress of performing the "soft reroute" operation when it receives the "bandwidth change indication" message. When this happens, the following actions can be performed:
  1. If the bandwidth change request is to reduce the bandwidth. In this case, if the bandwidth change request is within the rerouting domain (i.e. the absent of the external bandwidth change indicator IE), the connection owner may ignore the bandwidth change request and carry on the rerouting operation. It is because that the rerouting may be able to get around the trouble area. Otherwise, if the bandwidth change request is not within the rerouting domain (i.e. the present of the external bandwidth change indicator IE) and the new bandwidth requirement is acceptable to the connection owner, the connection owner may abort the "soft reroute" operation and may initiate the "modify request" message (i.e. ITU-T Q.2963 procedures). Otherwise, if the bandwidth change request is not within the rerouting domain and the new bandwidth requirement is not acceptable to the connection owner, the connection owner may clear the connection.
  2. If the bandwidth change request is to increase the bandwidth. In this case, the connection owner may ignore the bandwidth change request and carry on the rerouting operation.

It should be noted that it is possible to have multiple "bandwidth change indication" messages sent from the network and the called party to the calling party. However, it is a local implementation decision at the connection owner to deal with these multiple indications. In ITU-T Q.2963, section 5.1 clearly states that one and only one modification can be requested by the connection owner at one time. Therefore, the connection owner may wish to buffer the indications in the sequence of which they arrive; or the connection owner may simply discard the subsequent indications until the current modification procedures are completed.

Figure 4:
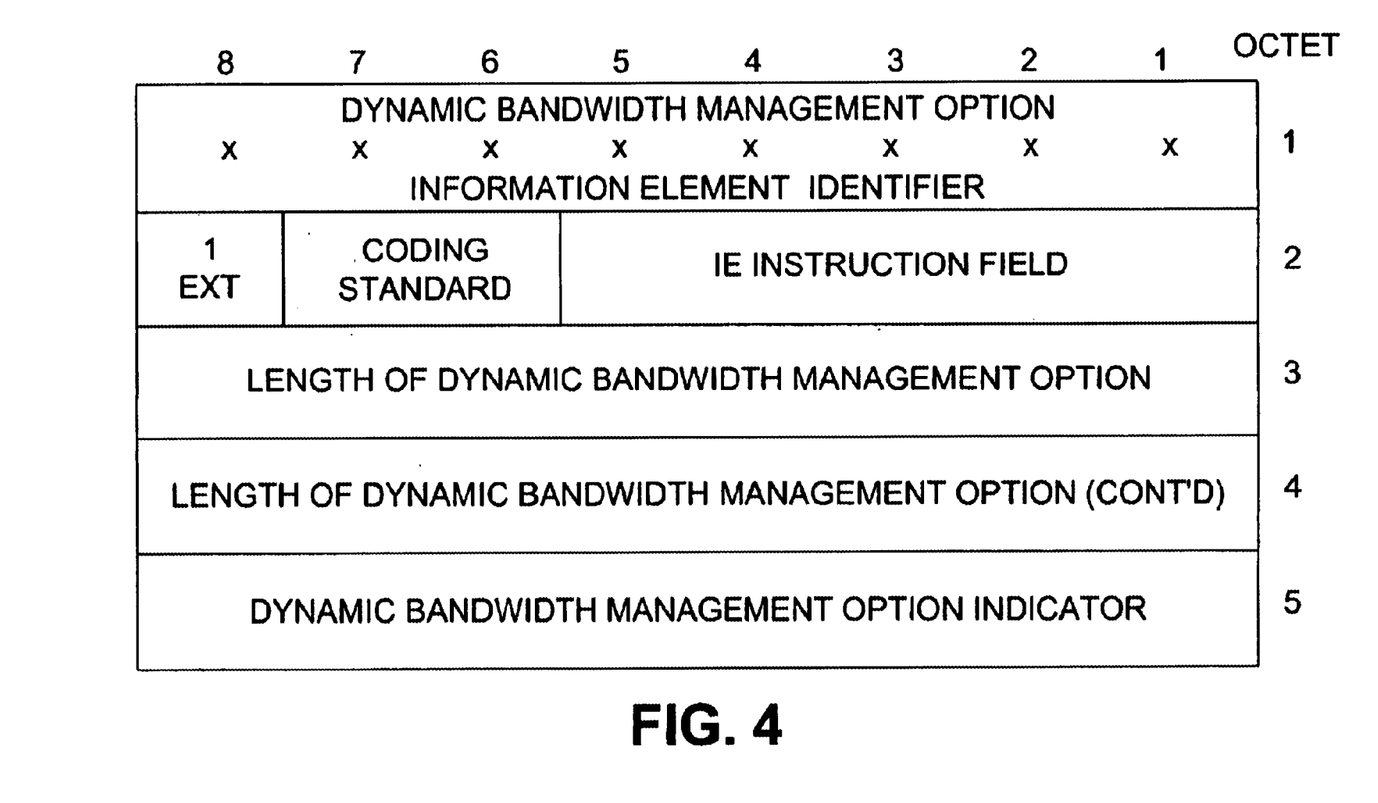
FIG. 4 shows a format of a dynamic bandwidth management option E.

FIG. 4 shows a format of a dynamic bandwidth management option IE which will be modified to contain "external bandwidth change indicator as will be shown below.

Following are a variety of messages used in connection with dynamic bandwidth management option and external bandwidth change indication feature, according to one embodiment of the invention.

Messages

SETUP Message

This message is sent by the preceding side to the succeeding side to initiate connection establishment. See the table below for addition to the message to support the bandwidth adjustment feature.

Message Type: SETUP

Direction: Preceding to succeeding

Significance: Global

TABLE 1

"Setup" message additional content

| Information element | Reference | Direction | Type | Length |
|---|---|---|---|---|
| Dynamic bandwidth management options | T.B.D | both | O | 5 |

CONNECT Message

This message is sent by the Succeeding side and delivered to the Preceding side to indicate connection acceptance by the called party. See the table below for addition to the message.

Message Type: CONNECT
Direction: Succeeding to preceding
Significance: Global

TABLE 2

"Connect" message additional content

| Information element | Reference | Direction | Type | Length |
|---|---|---|---|---|
| Dynamic bandwidth management options | T.B.D | both | O | 5 |

BANDWIDTH CHANGE INDICATION Message

This message is used by the network or the called party to specify the required new bandwidth for the connection from the connection owner. The message is sent from the succeeding side to the preceding side.

Message Type: BANDWIDTH CHANGE INDICATION
Direction: Succeeding to preceding
Significance: Global

TABLE 3

"Bandwidth change indication" message additional content

| Information element | Reference | Direction | Type | Length |
|---|---|---|---|---|
| Alternative ATM traffic descriptor | 6.4.5.7 | S -> P | O | 4–30 |
| Minimum acceptable ATM traffic descriptor | 6.4.5.26 | S -> P | O | 4–20 |
| External bandwidth change indicator | T.B.D | S -> P | O | 5 |

Information elements

TABLE 4

Dynamin bandwidth management options

| 8 | 7 | 6 | 5 | 4 | 3 | 2 | 1 | Octets |
|---|---|---|---|---|---|---|---|---|
| Dynamic bandwidth management options IE identifier | | | | | | | | 1 |
| Ext | Coding standard | | Flag | IE instruction field | | | | 2 |
| | | | | Res'd | | IE action indicator | | |
| Length of dynamic bandwidth management options contents | | | | | | | | 3 |
| Length of dynamic bandwidth management options contents (continued) | | | | | | | | 4 |
| Management option | | | | | | | | 5 |

TABLE 6

Coding standard (octet 2)

| Bits | Meaning |
|---|---|
| 7 6 | |
| 1 1 | ATM Forum specific |

TABLE 7

Management option (octet 5)

| Bits | Meaning |
|---|---|
| 8 7 6 5 4 3 2 1 | |
| 0 0 0 0 0 0 0 0 | Clear connection, if insufficient bandwidth |
| 0 0 0 0 0 0 0 1 | Inform new bandwidth requirement via "bandwidth change indication" message, set timer and wait for maintenance action from the connection owner |

TABLE 8

External bandwidth change Indicator

| 8 | 7 | 6 | 5 | 4 | 3 | 2 | 1 | Octets |
|---|---|---|---|---|---|---|---|---|
| External bandwidth change indicator IE identifier | | | | | | | | 1 |
| Ext | Coding standard | | Flag | IE instruction field | | | | 2 |
| | | | | Res'd | | IE action indicator | | |
| Length of external bandwidth change indicator contents | | | | | | | | 3 |
| Length of external bandwidth change indicator contents (continued) | | | | | | | | 4 |
| External flag | | | | | | | | 5 |

TABLE 9

Coding standard (octet 2)

| Bits | Meaning |
|---|---|
| 7 6 | |
| 1 1 | ATM Forum specific |

TABLE 10

External flag (octet 5)

| Bits | Meaning |
|---|---|
| 8 7 6 5 4 3 2 1 | |
| 0 0 0 0 0 0 0 1 | Outside scope of edge-based |

What is claimed is:

1. In an ATM network which is composed of a plurality of domains, a method of managing the resource demand of an active connection which spans one or more domains comprising steps of:
   at a maintenance node in one domain, performing a rerouting procedure;
   at a rendezvous node, labeling a resource change message whether the resource chance message indicating a resource chance request;
   at the maintenance node, identifying the labeling; and
   at the maintenance node, deciding, based upon the identification, whether the rerouting procedure, which is in progress, is continued.

2. The method of managing the resource demand of an active connection, according to claim 1, wherein the step of labeling comprising a further step of:

setting a flag in the resource change message depending on whether the resource change message originated outside the domain of the maintenance node.

3. The method of managing the resource demand of an active connection, according to claim 1, wherein the maintenance node is a connection owner of the active connection, comprising a further step of:

continuing to perform, at the connection owner, the rerouting procedure to its completion if the resource change request is for increasing the bandwidth or if the resource change request is for reducing the bandwidth and the resource change message originated outside the domain.

4. The method of managing the resource demand of an active connection, according to claim 1, wherein the maintenance node is a connection owner of the active connection, comprising a further step of:

aborting, at the connection owner, the rerouting procedure and initiating a modify request procedure if the resource change request is for reducing the bandwidth and the request is acceptable.

5. The method of managing the resource demand of an active connection, according to claim 1, wherein the maintenance node is a rerouting node of the active connection, comprising further steps of:

continuing to perform, at the rerouting node, the rerouting procedure to its completion if the resource change request is for increasing the bandwidth or if the resource change request is for reducing the bandwidth and the resource change message originated within the domain;

otherwise the rerouting node aborting the rerouting procedure; and sending, upstream towards a calling party, the resource change message, after having aborted or completed the rerouting procedure.

6. The method of managing the resource demand of an active connection, according to claim 3, wherein the rerouting procedure includes a step of:

breaking the active connection after a new connection has been established.

7. The method of managing the resource demand of an active connection, according to claim 3, wherein the rerouting procedure includes a step of:

breaking the active connection before a new connection is established.

8. The method of managing the resource demand of an active connection, according to claim 5, wherein the rerouting procedure includes a step of:

breaking the active connection after a new connection has been established.

9. The method of managing the resource demand of an active connection, according to claim 5, wherein the rerouting procedure includes a step of:

breaking the active connection before a new connection is established.

10. The method of managing the resource demand of an active connection, according to claim 3, wherein the rerouting procedure includes a step of:

receiving another resource change message at the connection owner, the message indicating a resource change request; and determining if the rerouting procedure is to be continued.

11. The method of managing the resource demand of an action connection according to claim 1, further comprising a step of:

aborting the rerouting procedure based on the decision of the decision step.

12. The method of managing the resource demand of an action connection according to claim 1, further comprising a step of:

aborting the rerouting procedure based on the decision of the decision step, and forwarding the resource change message towards an upstream.

13. The method of managing the resource demand of an action connection according to claim 1, further comprising a step of:

aborting the rerouting procedure based on the decision of the decision step, and initiating a modify request message.

14. The method of managing the resource demand of an action connection according to claim 1, further comprising a step of:

ignoring the received resource change message and continuing the rerouting procedure based on the decision of the decision step.

15. The method of managing the resource demand of an action connection according to claim 1, further comprising a step of: God aborting the rerouting procedure when the decision step decides that the resource change message originated outside the domain and the resource change request is for reducing the bandwidth.

16. The method of managing the resource demand of an action connection according to claim 1, further comprising a step of:

continuing the rerouting procedure when the decision step decides that the resource change message originated within the domain and the resource change request is for reducing the bandwidth.

17. In an ATM network which is composed of a plurality of domains, a method of managing the resource demand of an active connection which spans one or more domains comprising steps of:

performing a rerouting procedure at a maintenance node in one domain;

receiving a resource change message at the maintenance node, the message indicating a resource change request;

deciding to continue performing the rerouting procedure, which is in progress, in response to the resource change request based upon whether the resource change message originated outside the domain of the maintenance node;

receiving the resource change message at a rendezvous node;

at the rendezvous node, setting a flag in the resource change message, depending upon whether the resource change message originated outside the domain of the maintenance node; and at the rendezvous node, sending, upstream towards a calling party, the resource change message having said flag.

18. In an ATM network which is composed of a plurality of domains, a method of managing the resource demand of an active connection which spans one or more domains comprising steps of:

performing a rerouting procedure at a rerouting node in one domain;

receiving a resource change message at the rerouting node, the message indicating a resource change request;

deciding to continue performing the rerouting procedure in response to the resource change request based upon whether the resource change message originated outside the domain of the rerouting node;

labeling the resource change message whether the resource change message originated outside the domain of the rerouting node;

continuing to perform the rerouting procedure to its completion if the resource change request is for increasing the bandwidth or if the resource change request is for reducing the bandwidth and the resource change message originated within the domain, otherwise aborting the rerouting procedure; and sending, upstream towards a calling party, the resource change message, after having aborted or completed the rerouting procedure.

19. The method of managing the resource demand of an action connection according to claim 18, wherein the rerouting procedure includes a step of:

breaking the action connection after a new connection has been established.

20. The method of managing the resource demand of an action connection according to claim 18, wherein the rerouting procedure includes a step of:

breaking the action connection before a new connection is established.

21. A system for managing the resource demand of an active connection which spans one or more domains in an ATM network comprising:

a maintenance node having means for performing a rerouting procedure; and a rendezvous node having means for labeling a resource change message maintenance node;

the maintenance node further including:

means for identifying the labeling; and means for deciding, based upon the identification, whether the rerouting procedure, which is progress, is continued.

22. The system according to claim 21 wherein the labeling means includes means for setting, in the resource change message, a flag which indicates whether the resource change message originated outside the domain of the node.

23. The system according to claim 21 wherein the rendezvous node includes:

means for performing a rerouting procedure; and means for deciding whether the rerouting procedure of the rendezvous node is continued when the resource change message is received.

24. The system according to claim 21, wherein the maintenance node further comprising:

means for aborting the rerouting procedure based on the decision of the decision means.

25. The system according to claim 21, wherein the maintenance node further comprising:

means for continuing the rerouting procedure and ignoring the resource change request based on the decision of the decision means.

* * * * *